United States Patent [19]

Morimoto et al.

[11] Patent Number: 4,795,908

[45] Date of Patent: Jan. 3, 1989

[54] INFRARED DETECTOR

[75] Inventors: Makoto Morimoto, Hisai; Mikio Kondo, Tsu, both of Japan

[73] Assignee: Masushita Electric Works, Ltd., Osaka, Japan

[21] Appl. No.: 924,758

[22] Filed: Oct. 30, 1986

[30] Foreign Application Priority Data

Feb. 25, 1986 [JP] Japan .................................. 61-39968
Feb. 25, 1986 [JP] Japan .................................. 61-39969

[51] Int. Cl.$^4$ .................................................. G01J 5/06
[52] U.S. Cl. .................................. 250/353; 250/342
[58] Field of Search .................... 250/342, 353, 338 R

[56] References Cited

U.S. PATENT DOCUMENTS 4,258,255 3/1981 Guscott ................................ 250/342
4,447,726 5/1984 Mudge et al. ........................ 250/342
4,484,075 11/1984 Kahl, Jr. et al. .................... 250/342
4,486,661 12/1984 Guscott et al. ...................... 250/342
4,514,630 4/1985 Takahashi ........................... 250/353
4,604,524 8/1986 Kotlicki et al. ...................... 250/342
4,672,206 6/1987 Suzuki et al. ........................ 250/353
4,682,030 7/1987 Rose et al. .......................... 250/353

FOREIGN PATENT DOCUMENTS 0187180 1/1985 European Pat. Off. ............ 250/342
56-72382 6/1981 Japan .................................. 250/342
1551541 9/1977 United Kingdom ................ 250/342

*Primary Examiner*—Carolyn E. Fields
*Assistant Examiner*—John A. Miller
*Attorney, Agent, or Firm*—Burns, Doane, Swecker & Mathis

[57] ABSTRACT

An infrared detector is arranged so that a detection-input processing circuit part including an infrared sensor mounted on a circuit board is housed as isolated from ambient air in a chamber inhibiting any ambient air inflow, for sensing infrared rays emitted from a human body or the like object as condensed by a condenser irrespective of the ambient air conditions, the sensing ability of the infrared sensor the accuracy of which is likely to be easily deteriorated even with a very small change in the ambient temperature can be thereby stabilized, and a highly accurate infrared detection can be constantly achieved.

12 Claims, 3 Drawing Sheets

INFRARED DETECTOR

TECHNICAL BACKGROUND OF THE INVENTION

This invention relates to infrared detectors and, more particularly, to an infrared detector which includes an infrared sensor such as a pyroelectric element generating a voltage upon incident of infrared rays, for detecting the infrared rays originating from an object to be detected as condensed by a Fresnel lens.

Because the infrared detector of the type referred to performs its detecting operation in response to incident infrared rays originating, for example, from human bodies, the detector can be effectively utilized in such systems that are for supervising any intruder into a building or the like where the detector is installed to inform it, and the like purposes.

DISCLOSURE OF PRIOR ART

Generally, there have been proposed various types of detection systems wherein an optical sensor is combined with an optical lens, and one of such detection systems is the infrared detector. Disclosed, for example, in U.S. Pat. No. 4,484,075 to W. G. Kahl Jr. et al. is a detector of the same type in principle as that of the present invention, while this known detector is different in a provision of means for irradiating light from a light source. That is, in the U.S. Patent, an enclosure has an aperture, a condenser is provided immediately behind the aperture, and an infrared detecting element is provided on a circuit board of a detection-input responsive electronic circuit, at a focal point of the condenser to receive and detect infrared rays emitted from an object to be detected.

The known infrared detector of this U.S. Patent has had several problems in applying it to a detection of such infrared rays that are emitted from human bodies. First, since such optical sensor as the infrared sensor of pyroelectric type is likely to cause a detection error even with a relatively small change in the temperature condition, the aperture made in the enclosure of the known detector tends to allow the ambient air to flow into the enclosure to reach the sensor for causing the temperature change and thus the detection error. Secondly, the enclosure is required to have an outlet for lead wires from the circuit board within the enclosure to its exterior, and this outlet also tends to cause the ambient air to flow therethrough and even throughout the enclosure to circulate between the aperture and the outlet for readily causing a temperature change. Further, since the condenser positioned immediately behind the enclosure aperture is exposed to the ambient air, the known detector has been also defective in that the condenser readily becomes dusty to lower its optical efficiency, resulting in a detection error. Yet, the known detector has been largely restricted in the installation orientation and has been thus poor enough in the installation freedom for failing in the achievement of precise infrared detection when the orientation is improper.

TECHNICAL FIELD OF THE INVENTION

A primary object of the present invention is, therefore, to provide an infrared detector which can totally eliminate such various problems as have been invloved in the prior art to remarkably reduce detection error, and thus can realize accurate detection of the infrared rays emitted from human bodies or the like object.

According to the present invention, the above object is realized by providing an infrared detector which comprises a casing including a base and a cover fittable over the base, a Fresnel lens mounted to an opening formed in the cover, a circuit board mounted on the base and comprising a first part carrying a detection-input processing circuit including an infrared sensor positioned at a focal point of the Fresnel lens and second part carrying a terminal block for connection thereto of external lead wires, and means allowing infrared rays condensed by the Fresnel lens to pass therethrough and mounted to the base for isolating the first part of the circuit board from the second part of the board and from the ambient air by inhibiting its inflow thereinto.

According to such infrared detector of the present invention as arranged as above, the infrared sensor which tends to cause an erroneous operation when subjected to a change in the temperature condition is reliably isolated from the ambient air to inhibit air circulation, the detector can perform its infrated reception under substantially constant temperature condition, and thus a highly precise infrared detection can be ensured.

Other objects and advantages of the present invention shall be made clear in the following description of the invention detailed with reference to preferred embodiments shown in accompanying drawings.

BRIEF DESCRIPTION OF THE DRAWINGS

FIG. 8 is a perspective view of a metal fitting used for adjustably mounting the detector of FIG. 1 to the wall or the like;

Figures 1, 2, 3:
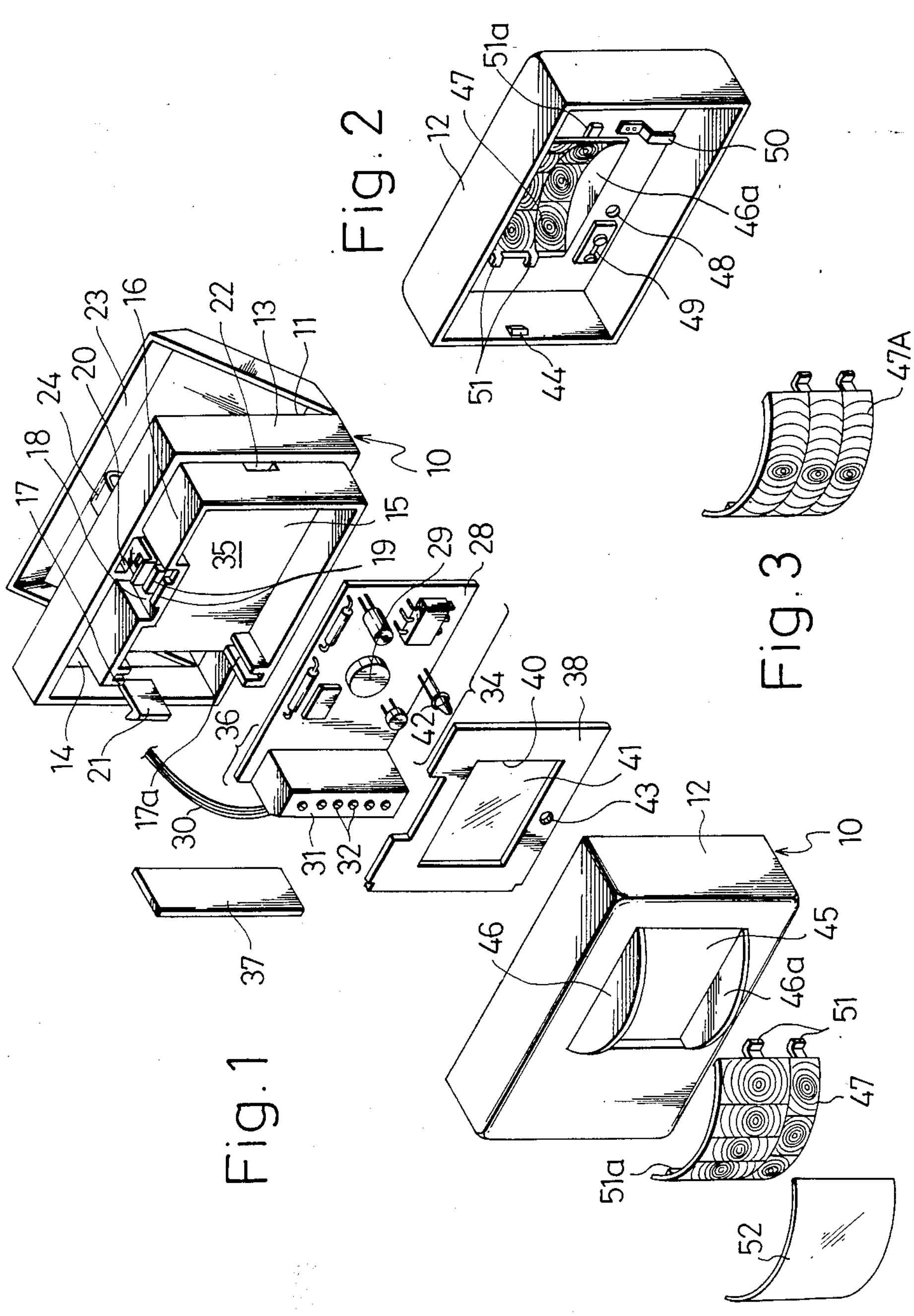
FIG. 1 is a perspective view as disassembled of an infrared detector according to the present invention.
FIG. 2 is a perspective view as partially assembled of a cover of the detector of FIG. 1 as viewed from rear side, with a Fresnel lens mounted thereto.
FIG. 3 is a perspective view in another form of the Fresnel lens applicable to the detector of FIG. 1.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIGS. 1 to 8, an infrared detector according to the present invention comprises a casing 10 which includes a base 11 and cover 12. The base 11 has a rectangular frame-shaped body 13 which is bored at one longitudinal end part of a relatively small area to form an opening 14 and is closed at the remaining area by a partition plate part 15. The body 13 is formed to have also a substantially U-shaped partition wall part 16 projecting from a peripheral edge part of the partition plate part 15 except for one edge part adjacent the opening 14. The partition wall part 16 is provided at both ends adjacent the opening 14 with a pair of opposing engaging grooves 17 and 17*a* which extend over the height of the partition wall part 16, and substantially in the center of one longitudinal wall portion with an inward recess 18 in which a plurality of engaging projections 19 are provided as mutually spaced in the height direction of the partition wall part 16. A through hole 20 is provided in an upper part of the body 13 at a position corresponding to the recess 18. Further, a hook 21 is provided at the center of one longitudinal end wall of the body 13 defining the opening 14, and an engaging recess 22 is made preferably in the center of a widthwise wall portion of the partition wall part 16 at the other longitudinal end of the body 13.

Figure 8:
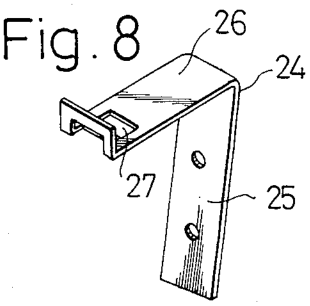

To the back of the body 13, a supplementary base 23 of a similarly rectangular dish shape but trapezoidal in every side view is attached. In the present instance, this supplementary base 23 is coupled to the base 13 preferably as hinged along one longitudinal side edge, e.g., the lower side in FIG. 1, so that the body 13 can take a position tilted with respect to the supplementary base 23. An angle adjusting metal fitting 24 generally L-shaped in side view is secured at one leg 25 to the inner bottom wall of the supplementary base 23 while the other leg 26 is extended forward through the through hole 20 in the body 13 (FIGS. 1 and 8). The metal fitting 24 is further provided in an extended end part of the other leg 26 with a hole 27 into which each of the projections 19 on the partition wall part 16 can be engaged so that, by engaging a suitable one of the projections 19 in the hole 27, a relative angular position of the body 13 with respect to the supplementary base 23 can be adjusted. Respective trapezoidal, peripheral side walls of the supplementary base 23 are tilted backwardly inward, preferably at an angle of 45 degrees.

Mounted on the front side of the base 11 is a circuit board 28 which faces the cover 12 and carries thereon respective elements of a detection-input processing circuit including an infrared sensor 29, as well as a terminal block 31 to which external lead wires 30 are connected. The infrared sensor 29 may be any known pyroelectric element or, preferably, an element consisting of a Pb-Zr-Ti alloy. The terminal block 31 has a plurality of connecting terminals 32 on the front side and wire inserting holes 33 on a lateral side facing the opening 14 of the base 11, the holes 33 corresponding number to the terminals 32 (see FIG. 5). The circuit board 28 is mounted onto the base 11 in such that a substantial part, i.e., the right-hand end, 34 of the board for the detection-input processing circuit including the infrared sensor 29 is housed in a chamber 35 defined by the partition plate and wall parts 15 and 16 of the base 11, whereas a remaining part 36 thereof where the terminal block 31 is mounted onto the board 28 is extended past the engaging grooves 17 and 17*a* so as to occupy part of the opening 14 of the base 11.

Figure 5:
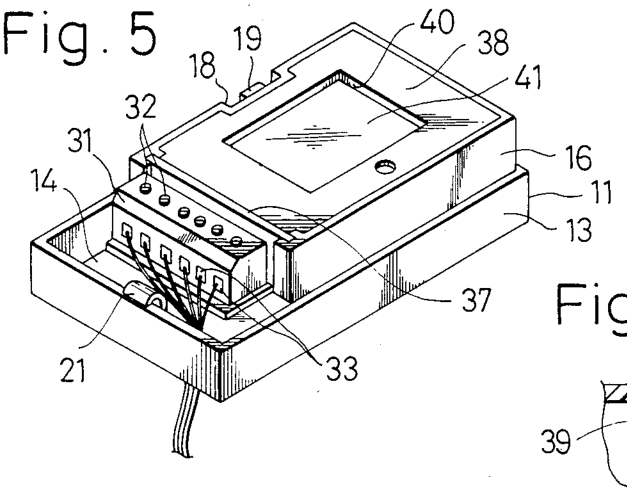
FIG. 5 is a perspective view as further assembled of the detector of FIG. 1 but with the cover removed.
Figure 4:
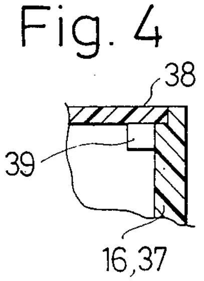
FIG. 4 is a fragmentary sectional view of a case of the detector of FIG. 1, for showing a coupled state of front plate and partition wall defining an isolated chamber.
Figure 6:
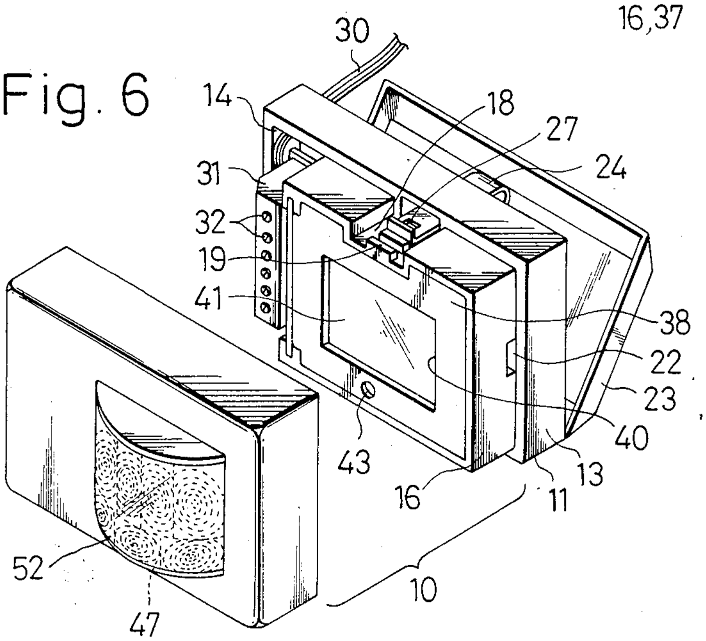
FIG. 6 is a perspective view as still further assembled of the detector of FIG. 1 and as viewed from an angle different from FIG. 5, with the cover shown as being assembed to the base having other elements assembled.

Further provided on the circuit board 28 is an isolating or partition plate 37 which is engaged at both ends into the grooves 17 and 17*a* to be disposed between the circuit-carrying substantial part 34 and the terminal-block-carrying end part 36 of the board for isolating them from one another. It will be appreciated here that the chamber 35 is surrounded by the rectangularly provided partition wall part 16 and isolating plate 37, the latter plate particularly isolating the chamber from the opening 14 of the base 11. Further, the chamber 35 is covered on the open front side by means of a front plate 38 which can be air-tightly joined to front side edges of the partition wall part 16 and isolating plate 37 in such manner as seen in FIGS. 4–6. While in the drawings the front plate 38 is shown to be joined edgewise to the inner periphery at front edges of the partition wall part 16 and isolating plate 37, it may be of course possible, if required, to prepare the front plate 38 to conform rather to the outer dimensions at the front edges of the partition wall part 16 and isolating plate 17, and thus to join the front plate 38 along its rear side periphery to the front edges of the wall part 16 and plate 37. It is desirable in either case to provide a sealing material 39 along such joint between the partition wall part and insulating plate 16 and 37 and the front plate 38 (see FIG. 4). Further, the front plate 38 has a window 40 disposed in front of the infrared sensor 29 mounted on the front side of the circuit board 28, to which window 40 a filter member 41 is attached. With this provision of the front plate 38, in cooperation with the partition plate and wall parts 15 and 16 and isolating plate 37 of the base 11, it is ensured that the chamber 35 is isolated from the ambient air, so as not to expose the interior of the chamber 35 to the ambient air. Accordingly, no air flow is caused to be present with respect to the detection-input processing circuit part 34 including the infrared sensor 29 on the circuit board 28 and housed within the chamber 35, and the detection error occurring due to any change in the ambient temperature at the processing circuit can be well restrained. For the filter member 41, it is desired to employ a pigment-containing polyethylene film high in the permeability to the far infrared rays and also in the screening effect with respect to visible rays. For the pigment to be mixed in the polyethylene film, an inorganic compound which can be enumerated is titanium oxide, an addition of 0.2–1.0 weight % of which to polyethylene may suffice the purpose. As to its grain size, it has been experimentarily known that 0.2–0.3 $\mu$m will result in an excellent screening effect with respect to the visible rays of the central wave length (about 0.4 $\mu$m) in the visible range. When the film may be of a white appearance, it may be possible to mix calcium carbonate or the like.

An operating state indicating lamp 42 is preferably included in the input processing circuit on the circuit board 28 to allow the user to visually observe externally the operating state of the detector, in which case a small window 43 having a transparent film attached thereto is made in the front plate 38 below the window 40 at a position opposing the lamp 42.

The cover 12 is generally of a rectangular box shape opened fully on the rear side and fittable at the opened rear side edges to the front side edges of the body 13 surrounding the partition wall part 16 and opening 14 of the body 13. In the present instance, the cover 12 is provided, on an inner peripheral edge part, with a recess (not shown) at a position corresponding to the hook 21 of the base 11 for engaging therein the hook 21 and, on an opposing inner peripheral edge part, with a projection 44 at a position corresponding to the recess 22 of the base 11 for being engaged therein. Fitting the rear open side edges of the cover 12 thus to the front side edges of the body 13 of the base 11, with the hook 21 engaged in the corresponding recess and the projection 44 engaged in the recess 22, therefore, the cover 12 can be mounted onto the base 11, enclosing therein the input processing circuit in the isolated chamber 35 and others on the base body 13. Further, the cover 12 has a lens mounting window 45 made in the front side wall at a position opposed to the window 40 of the front plate 38, which window 45 is provided at its upper and lower edges with frontward extended arcuate projections 46 and 46*a*. A Fresnel lens 47 is mounted to the window 45 to fit along side edges of the window and arcuate edges of the projections 46 and 46*a*. Immediately below the window 45, the cover 12 also has a hole 48 in alignment with the lamp 42 and window 43, so as to allow the user to visually observe the operating state of the indicator 42 from the exterior of the cover 12. Desirably, a covering piece 49 is slidably mounted inside the cover 12 to be adjacent the window 48, for closing the window 48 by sliding the piece 49 properly. Such arrangement enables it possible to close the window 48 when it is not desired to allow a third person to visually observe the indication of the detector's operating state. Further, such a depressing arm 50 that functions to push a damper switch (not shown) mounted, for example, on the terminal-block-carrying part 36 on the circuit board 28 may be provided onto the inner wall of the cover 12.

Figure 9:
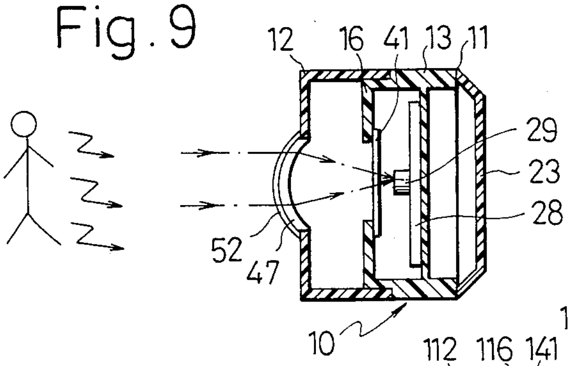
FIG. 9 is a schematic cross-sectional view of the detector of FIG. 1.

The Fresnel lens 47 per se may be arranged in any known manner, for optimumly condensing infrared rays incoming in every direction, and focusing them through the filter member 41 of the front plate 38 upon the infrared sensor 29 on the circuit board 28. In addition, the Fresnel lens 47 is made slightly larger in size than the window 45 and to be provided at side edges with hooks 51 and 51*a* for reliably firmly securing the lens to the peripheral edge of the window 45. It will be understood that, as the Fresnel lens 47, such a lens 47A having a different lens division as shown in FIG. 3 may be employed, as required. A filter member 52 is heat bonded to the front surface of the Fresnel lens 47 or the filter member 52 and the Fresnel lens 47 are integrally formed during molding of the lens 47. The filter member 52 may be made of the same material as the filter member 41 of the front plate 38, that is, the material may be a sheet high in the permeability to the far infrared rays and in the screening effect to any visible rays. In this case, the incoming infrared rays must pass through the two filter members 41 and 52 before reaching the sensor 29 (see FIG. 9) and thus visible rays causing erroneous detection can be remarkably reduced.

In the infrared detector arranged as has been disclosed above according to the present invention, the detection-input processing circuit part 34 of the circuit board 28 including the infrared sensor 29 is housed within the substantially air-tightly isolated chamber 35 within the detector casing for effectively restraining the temperature change due to any ambient air inflow into the casing, so that the infrared sensor 29 can perform its detecting operation highly accurately, without causing any detection error in this respect. As the terminal block 31 provided onto the circuit board 28 is disposed outside the isolated chamber 35 so that the terminal-block-carrying part 36 of the board will be in the opening 14 of the base 11 to be accessible from the rear side, the lead wires 30 of the terminal block 31 can be led out of the detector without any hindrance. Since the Fresnel lens 47 is covered with the filter member 52 which effectively screens visible rays, the infrared detection can be made highly reliable under a favorable condition of less presence of the visible rays and less deterioration in the optical efficiency due to dust or the like.

Figure 7:
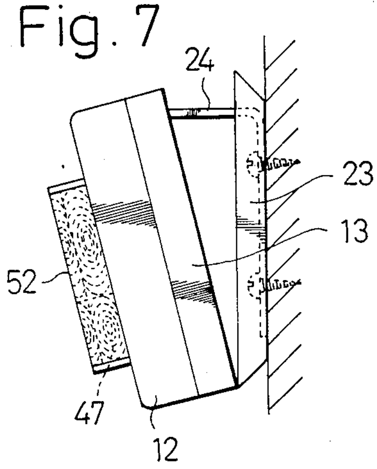
FIG. 7 is a side view showing a state in which the detector of FIG. 1 is mounted against a wall surface.
Figure 10:
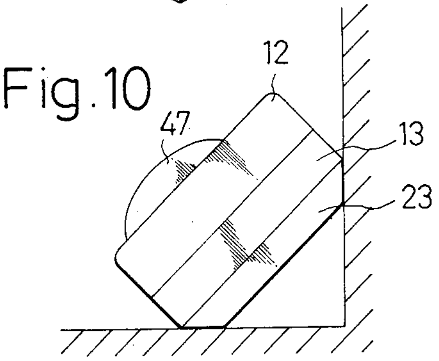
FIG. 10 is a side view showing a state in which the detector of FIG. 1 is mounted differently from FIG. 7.

In installing the detector of the present invention on a building wall or the like, the Fresnel lens 47 can be oriented easily optimumly, as will be clear from FIG. 7, even after fixing of the detector to the wall by driving and fastening screws into the wall surface through the fixing leg 25 of the adjusting metal fitting 24 and through the supplementary base 23, since the casing 10 can take a desired tilted position by engaging a desired one of the projections 19 provided on the base 11 into the hole 27 of the other leg 26 of the metal fitting 24, and the detector can realize a highly accurate detection in this respect, too. Further, the 45 degrees tilting at the peripheral side walls of the supplementary base 23 is effective to allow the detector to be readily installed at a corner of two walls intersecting at right angles, as shown in FIG. 10.

Figure 11:
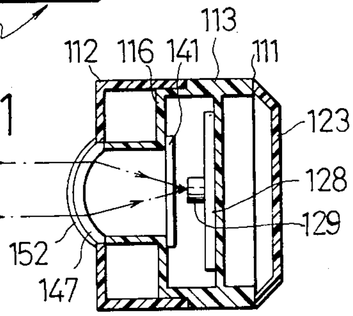
FIG. 11 is a schematic cross-sectional view in another embodiment of the detector according to the present invention.

The present invention may be modified in various ways. For example, as will be clear from FIG. 11 in comparison with FIG. 9, the partition wall part 116 of the base 111 may be further extended so that the Fresnel lens 147 coated with the filter member 152 can be directly mounted to the extended end of the partition wall part 116. In FIG. 11, the same members as those in the foregoing embodiment are denoted by the same reference numerals but added by 100. Other arrangement and operation are substantially the same as those of the foregoing embodiment.

What is claimed as our invention is:

1. An infrared detector comprising a casing including a base and a cover fittable over said base, a condenser mounted to an opening formed in said cover, a circuit board mounted on said base and comprising a first part carrying a detection-input processing circuit including an infrared sensor positioned at the focal point of said condenser and a seocnd part carrying a terminal block for connection thereto of external lead wires, separating means allowing infrared rays condensed by the condenser to pass therethrough and mounted to the base for separating said first part of said circuit board from said second part of the board and from the ambient air by inhibiting its inflow, and screening means mounted on at least one of said cover and said separating means for screening visible rays from the rays passing through said cover and said separating means, said base comprising a body defining an opening at one part and closed at the other remaining part by a partition plate part, and a partition wall part projecting from said body toward said cover in surrounding relationship to said partition plate part except at an edge adjacent said opening of the body for defining a chamber in which said first part carrying said detection-input processing circuit of said circuit board is housed; and said separating means comprises said partition plate and wall parts of the base, a separation plate provided at an open edge of the partition wall part and extending toward said cover for separating said first and second parts of the circuit board when the board is mounted on the base with said second part overlying said opening of the body, and a front plate joined to front edges of said partition wall part and separation plate to close a front side of the chamber and having a window covered by said screening means and positioned in front of said infrared sensor on the first part of the circuit board.

2. A detector according to claim 1, which further comprises a supplementary base disposed on the rear side of said base opposite to said cover, said supplementary base being coupled to said base through a hinge connection providing for rocking motion of the base with respect to the supplementary base.

3. A detector according to claim 2, which further comprises an angle adjusting metal fitting secured at one end to said supplementary base, said metal fitting being provided at the other end with an engaging means, and said base is provided with a plurality of engaging members mutually spaced in a forward direction for engagement with said engaging means of the metal fitting.

4. A detector according to claim 1, wherein said terminal block includes connecting terminals and wire inserting holes positioned for connecting lead wires respectively to each of said connecting terminals, said lead wires extending rearwardly through said opening of said base.

5. A detector according to claim 1, wherein said partition wall part is provided adjacent said opening of said body with grooves extending forwardly for the full height of the wall part, said separation plate being fitted at both ends in said opposing grooves.

6. A detector according to claim 1, wherein said condenser is covered by said screening means.

7. A detector according to claim 1, wherein said condenser is covered with a second said screening means, the first-named screening means and said second screening means formed of polyethylene film.

8. A detector according to claim 2, wherein said supplementary base has peripheral side walls tilted rearwardly inward at an angle of 45 degrees.

9. A detector according to claim 1, wherein said condenser is a Fresnel lens which is provided at side edges thereof with hooks to be engaged to side edges of said opening of said cover.

10. A detector according to claim 1, wherein said base includes a front side facing said cover, and a rear side facing away from said cover, said circuit board mounted on said front side of said base, said first and second parts comprising first and second ends of said circuit board which are separated by said separating means, said separating means projecting toward said cover.

11. An infrared detector comprising a casing including a base and a cover fittable over said base, a condenser mounted to an opening formed in said cover, a circuit board mounted on said base and comprising a first part carrying a detection-input processing circuit including an infrared sensor positioned at the focal point of said condenser and a second part carrying a terminal block for connection thereto of external lead wires, separating means allowing infrared rays condensed by the condenser to pass therethrough and mounted to the base for separating said first part of said circuit board from said second part of the board and from the ambient air by inhibiting its inflow, and screening means mounted on at least one of said cover and said separating means for screening visible rays from the rays passing through said cover and said separating means, said base including a front side facing said cover, and a rear side facing away from said cover, said circuit board mounted on said front side of said base, said first and second parts comprising first and second ends of said circuit board which are separated by said separating means, said separating means projecting toward said cover.

12. A detector according to claim 11, wherein said base comprises a body defining an opening at one part and closed at the other remaining part by a partition plate part, and a partition wall part projecting from said body toward said cover in surrounding relationship to said partition plate part except at an edge adjacent said opening of the body for defining a chamber in which said first part carrying said detection-input processing circuit of said circuit board is housed; and said separating means comprises said partition plate and wall parts of the base, a separation plate provided at an open edge of the partition wall part and extending toward said cover for separating said first and second parts of the circuit board when the board is mounted on the base with said second part overlying said opening of the body, and a front plate joined to front edges of said partition wall part and separation plate to close a front side of the chamber and having a window covered by said screening means and positioned in front of said infrared sensor on the first part of the circuit board.

* * * * *